United States Patent
Don et al.

(10) Patent No.: US 11,720,256 B2
(45) Date of Patent: Aug. 8, 2023

(54) MAXIMIZING POWER SAVINGS USING IO MONITORING

(71) Applicant: Dell Products L.P., Hopkinton, MA (US)

(72) Inventors: Arieh Don, Newton, MA (US); Krishna Deepak Nuthakki, Bangalore (IN); Elie Jreij, Pflugerville, TX (US)

(73) Assignee: Dell Products L.P., Hopkinton, MA (US)

( * ) Notice: Subject to any disclaimer, the term of this patent is extended or adjusted under 35 U.S.C. 154(b) by 43 days.

(21) Appl. No.: 17/551,267

(22) Filed: Dec. 15, 2021

(65) Prior Publication Data

US 2023/0185456 A1    Jun. 15, 2023

(51) Int. Cl.
G06F 3/06 (2006.01)

(52) U.S. Cl.
CPC .......... *G06F 3/0613* (2013.01); *G06F 3/0611* (2013.01); *G06F 3/0625* (2013.01); *G06F 3/0659* (2013.01); *G06F 3/0673* (2013.01)

(58) Field of Classification Search
CPC .... G06F 3/0613; G06F 3/0611; G06F 3/0625; G06F 3/0659; G06F 3/0673
USPC ......................................................... 711/111
See application file for complete search history.

(56) References Cited

U.S. PATENT DOCUMENTS

| | | | | |
|---|---|---|---|---|
| 4,503,940 A | * | 3/1985 | Watanabe | B66B 5/02 187/296 |
| 5,928,365 A | * | 7/1999 | Yoshida | G06F 12/023 713/340 |
| 9,575,677 B2 | * | 2/2017 | Ellis | G06F 3/0688 |
| 2006/0179333 A1 | * | 8/2006 | Brittain | G11C 11/4096 713/320 |
| 2006/0282686 A1 | * | 12/2006 | Bahali | G06F 1/3203 713/300 |
| 2008/0040562 A1 | * | 2/2008 | Gower | G06F 1/3225 713/320 |
| 2008/0104339 A1 | * | 5/2008 | Nakagawa | G06F 3/0653 711/170 |
| 2009/0006876 A1 | * | 1/2009 | Fukatani | G06F 3/0625 713/320 |
| 2010/0235840 A1 | * | 9/2010 | Angaluri | G06F 9/5094 718/102 |
| 2010/0274953 A1 | * | 10/2010 | Lee | G06F 12/0607 711/E12.001 |
| 2010/0275050 A1 | * | 10/2010 | Hong | G06F 1/3234 711/E12.001 |
| 2011/0047316 A1 | * | 2/2011 | Farhan | G06F 1/3275 713/320 |

(Continued)

*Primary Examiner* — Christopher B Shin
(74) *Attorney, Agent, or Firm* — Anderson Gorecki LLP

(57) ABSTRACT

A storage system such as a storage array in a data center calculates per-application power utilization based on monitored IOs. IOs generated by applications that are tolerant of rescheduling may be rescheduled to a time when power is less costly or more available. Storage array power consumption is reduced if all services host applications can tolerate greater IO latency without service level violations. Server power consumption is reduced if all services host applications can tolerate greater IO latency without service level violations. Power consumption by the servers, storage array, or both is reduced if power consumption reaches a predetermined level relative to available power.

20 Claims, 3 Drawing Sheets

(56) References Cited

U.S. PATENT DOCUMENTS

| | | | | |
|---|---|---|---|---|
| 2015/0220135 A1* | 8/2015 | Huang | .................. | G06F 3/0647 |
| | | | | 713/320 |
| 2015/0261473 A1* | 9/2015 | Matsuyama | .......... | G06F 3/0659 |
| | | | | 711/103 |
| 2015/0309751 A1* | 10/2015 | Ellis | ...................... | G06F 3/0625 |
| | | | | 711/154 |
| 2015/0309752 A1* | 10/2015 | Ellis | ........................ | G06F 1/329 |
| | | | | 711/103 |
| 2016/0054780 A1* | 2/2016 | Bodas | ..................... | H04L 43/08 |
| | | | | 713/320 |
| 2016/0054781 A1* | 2/2016 | Rajappa | ................. | G05B 15/02 |
| | | | | 713/320 |
| 2018/0107417 A1* | 4/2018 | Shechter | ............... | G06F 3/0619 |
| 2018/0335978 A1* | 11/2018 | Tidwell | ..................... | G06F 1/28 |
| 2019/0065086 A1* | 2/2019 | Margetts | ................ | G06F 3/0688 |
| 2019/0073139 A1* | 3/2019 | Kim | ....................... | G06F 3/0659 |
| 2021/0397239 A1* | 12/2021 | Sethi | ....................... | G06F 1/3296 |
| 2022/0075536 A1* | 3/2022 | Swami | ................... | G06F 3/0634 |
| 2023/0060804 A1* | 3/2023 | Zhu | ........................ | G06F 1/3278 |

\* cited by examiner

MAXIMIZING POWER SAVINGS USING IO MONITORING

TECHNICAL FIELD

The subject matter of this disclosure is generally related to server clusters and electronic data storage, and more particularly to power management in a data center or other multi-node computing and storage environment.

BACKGROUND

A data center typically includes clusters of host servers and one or more data storage systems that maintain host application data. The servers run instances of host applications that may support services such as email, sales, accounting, inventory control, manufacturing control, and a wide variety of other organizational functions. Each server may simultaneously support multiple instances of one or more host applications. Examples of data storage systems include storage area networks (SANs), storage arrays, network-attached storage (NAS), and a variety of other storage architectures. The number of servers and storage system capacity may be increased to accommodate demand for increased computing and storage capabilities. However, as the server count reaches hundreds or thousands, and as storage systems are scaled up, providing sufficient power can become a significant part of operating costs. In certain situations, it may even become impractical to power all equipment due to constraints on power availability.

SUMMARY

In some implementations a method is implemented by a storage system configured to maintain data used by a plurality of applications running on a plurality of servers, the method comprising: the storage system calculating power utilization of each of the plurality of applications as a function of input-output (IO) commands received from the plurality of servers over a period of time; and prompting adjustment of at least one setting based on the calculated power utilization of each of the plurality of applications to alter future power utilization.

An apparatus in accordance with some implementations comprises: a storage system configured to maintain data used by a plurality of applications running on a plurality of servers, the storage system configured to calculate power utilization of each of the plurality of applications as a function of input-output (IO) commands received from the plurality of servers over a period of time, and prompt adjustment of at least one setting based on the calculated power utilization of each of the plurality of applications to alter future power utilization.

In accordance with some implementations, a non-transitory computer-readable storage medium stores instructions that when executed by a storage system perform a method for power management, the method comprising: the storage system calculating power utilization of each of a plurality of applications as a function of input-output (IO) commands received from a plurality of servers over a period of time; and prompting adjustment of at least one setting based on the calculated power utilization of each of the plurality of applications to alter future power utilization.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
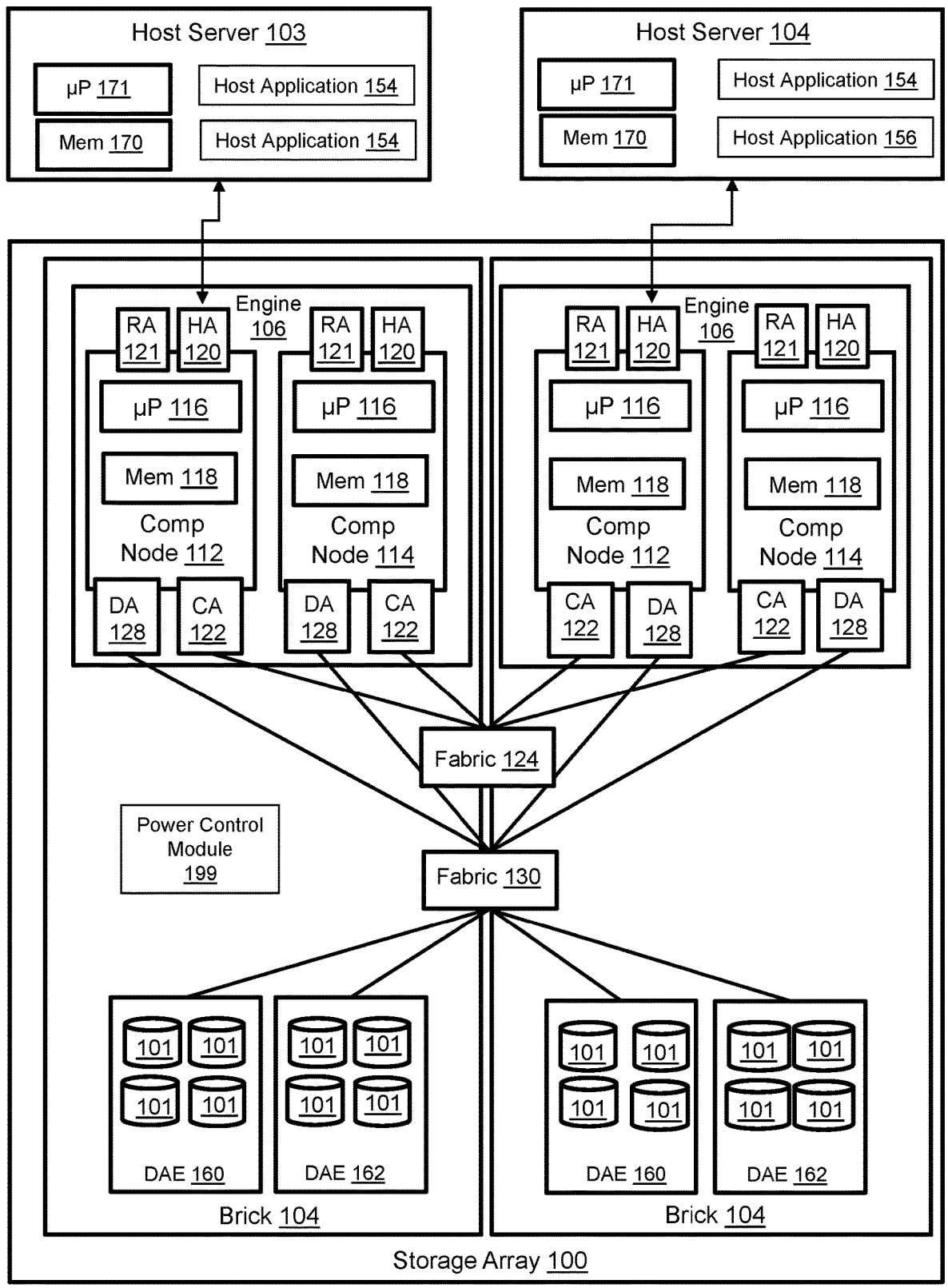
FIG. 1 illustrates a simplified data center environment with host servers and a storage array with a power control module configured to calculate per-application power utilization and prompt adjustments to power consumption.

FIG. 1 illustrates a simplified data center environment with host servers 103, 104 and a storage array 100 with a power control module 199 configured to calculate per-application power utilization and prompt adjustments to power consumption. The power control module calculates power utilization information to prompt setting adjustments of the storage array, the host servers, or both, to reduce power costs and avoid exceeding available power limits.

Those of ordinary skill in the art will recognize that the storage array would typically support more than two host servers and the data center could include multiple storage arrays. Nevertheless, the techniques and features disclosed herein are applicable to such larger scale implementations.

The host servers 103, 104 include volatile memory 170 and one or more tangible processors 171. The memory and processors are used to run instances of host applications 154, 156. Host application instances may run on virtual machines under a hypervisor or in containers. An individual host server may simultaneously support instances of a single host application or instances of multiple host applications. In the illustrated example, host server 103 runs instances of host application 154 and host server 104 runs instances of host applications 154 and 156. Instances of host applications prompt generation of input-output commands (IOs) to read and/or write host application data that is maintained by the storage array 100.

The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the host servers 103, 104 from the compute nodes 112, 114. Nevertheless, the host applications could run on the compute nodes. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
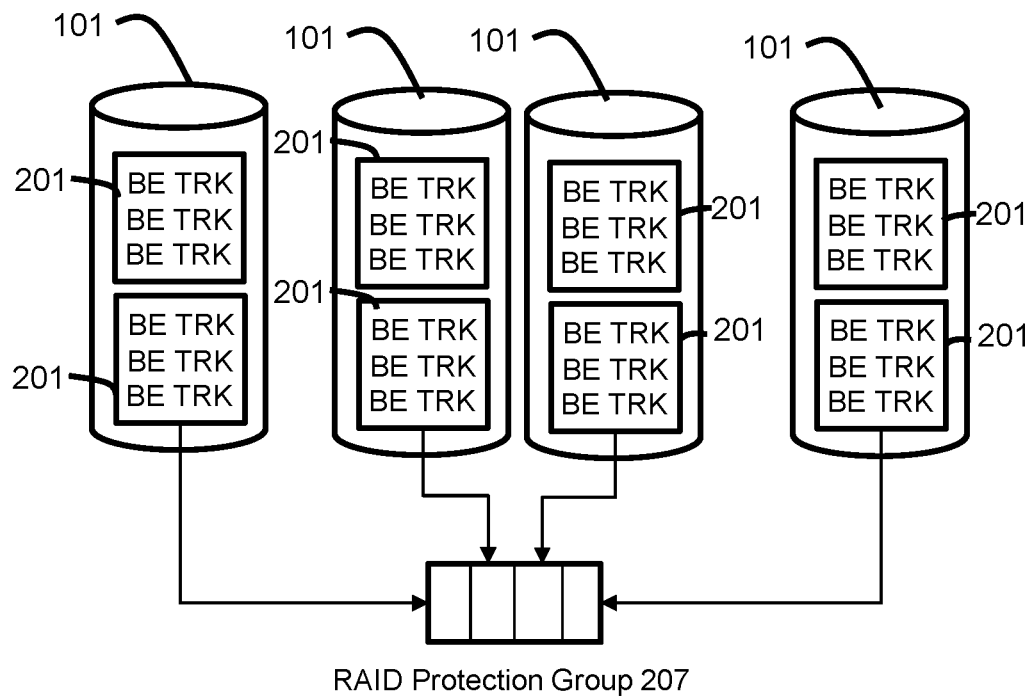
FIG. 2 illustrates layers of abstraction between managed drives and storage objects.
Figure 2:
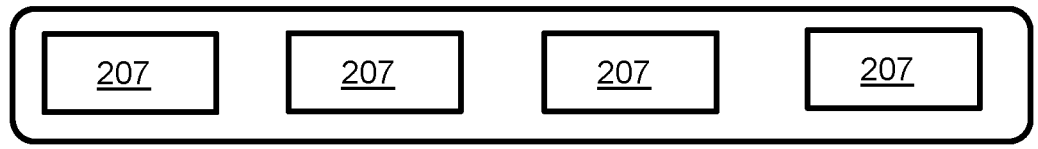
Figure 2:
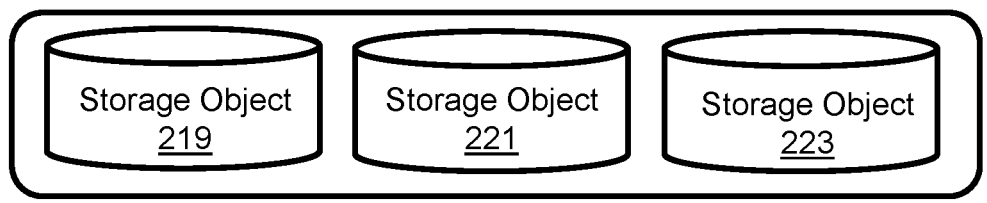
Figure 2:

Referring to FIGS. 1 and 2, the host application data is maintained on the managed drives 101 of the storage array 100 but the managed drives are not discoverable by the host servers 103, 104. To make the host application data accessible to the host servers, the storage array 100 creates logical storage objects that can be discovered by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., production volume. From the perspective of the host servers 103, 104, each production storage object 219, 221, 223, 225, 227, 229 is a single disk having a set of contiguous fixed-size logical block addresses (LBAs) on which data used by the instances of a host application resides. However, the host application data is stored at non-contiguous addresses on various managed drives 101. Separate storage groups 231, 233 of production storage objects 219, 221, 223 and 225, 227, 229 may be created for each host application 154, 156, respectively. Multiple instances of a single host application may use data from the same storage group, but instances of different host applications do not use data from the same storage group.

The compute nodes 112, 114 maintain metadata that maps between the LBAs of the production storage objects 219, 221, 223, 225, 227, 229 and physical addresses on the managed drives 101 in order to process IOs from the host servers. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects 219, 221, 223, 225, 227, 229. The host application data is logically stored in front-end tracks (FE TRKs), that may be referred to as blocks, on the production storage objects and the FE TRKs are mapped to BE TRKs on the managed drives by the metadata.

Figure 3:
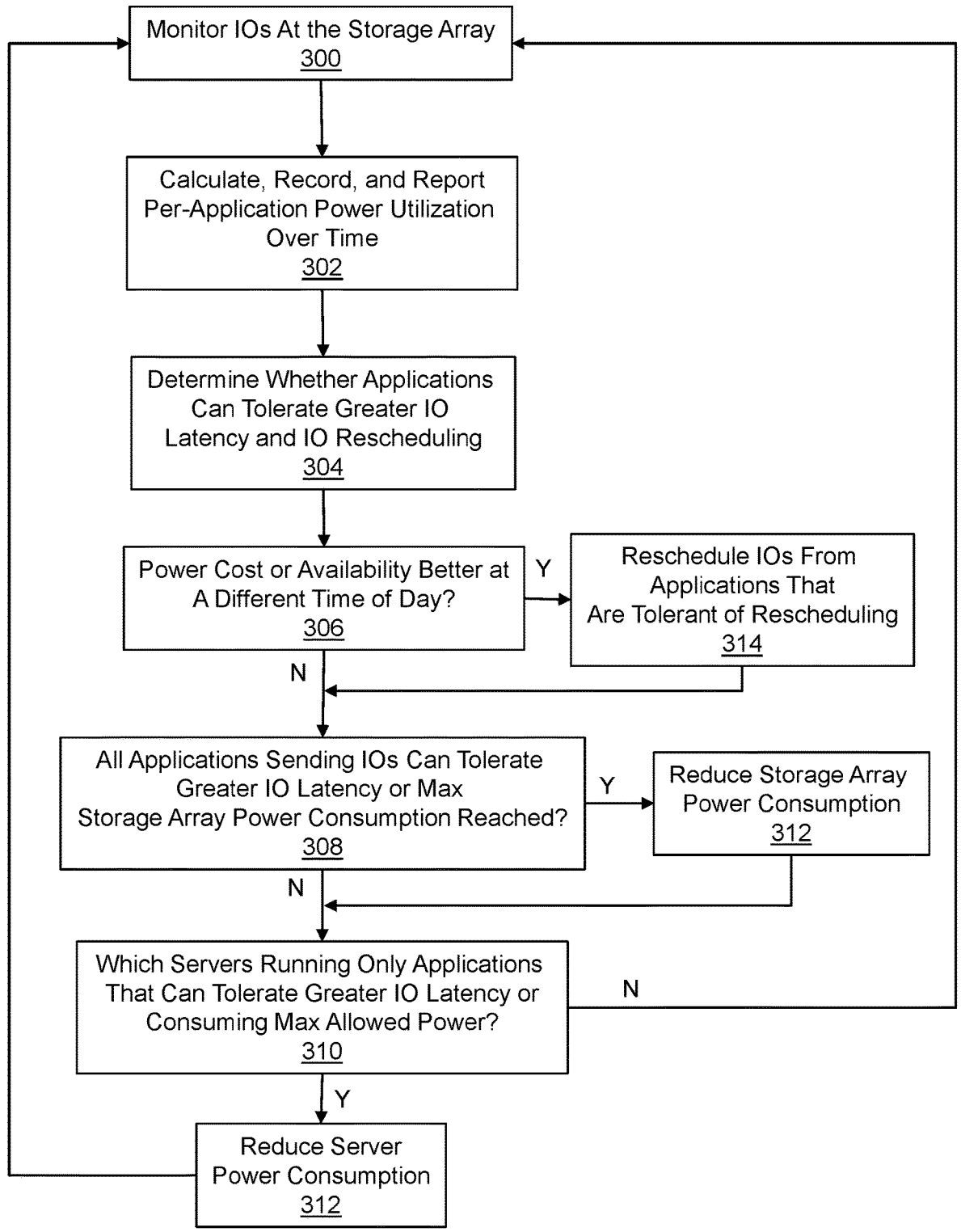
FIG. 3 illustrates a method for managing power consumption based on IO monitoring by the storage array.

FIG. 3 illustrates a method for managing power consumption based on IO monitoring by the storage array. Step 300 is monitoring IOs at the storage array. The power control module monitors and logs IOs sent to the storage array from the host application instances running on the host servers over time. Step 300 may include determining and recording which application generated each IO and calculating a statistical representation of per-application IO activity. A wide variety of application awareness techniques may be utilized to associate host applications with IOs and IO activity. Because each storage group is only associated with one host application, the host application may be identified based on the storage group to which each IO is directed. The storage group may include a namespace that identifies the host application by name, but even without the host application name it is possible to determine which IOs were generated by instances of the same host application based on the target storage group. In some implementations the host servers tag IOs with a host application identifier that can be used by the power control module to determine the host application associated with each IO. The power control module may also monitor which host server generated each IO, thereby associating IOs and IO activity with both host applications and host servers. The host server may be identified based on the port on which the IO was received.

Step 300 is calculating, recording, and reporting per-application power utilization over time. Power utilization may be determined from power supply readings that are provided to the power control module by the host servers and the storage array power supply. IOs may be used as a proxy indicator of power consumption. For example, and without limitation, if a host server runs multiple host applications, then the power utilization reading is divided between the multiple applications based on the following formula: application power utilization=(server power utilization*application IO bytes)/server IO bytes). Alternatively, or additionally, a per-IO power value can be multiplied by a number of IOs processed over time to calculate power utilization over that time. The power utilization data is logged and may be graphed to visually show the power utilization of each host application and server over a selectable period of time. The per-application power utilization may include individual and statistical data records that indicate power utilization for the application by individual host server, by all host servers, by time of day, and by day of week, e.g., graphing and reporting 8-8:05 AM power utilization by application A was X, 8:05-9 AM power utilization by application A was Y. The application name, e.g., storage group name, application service level, host server, e.g., host registration, on which the application was running may also be logged and reported. Further, overall power utilization by all host applications and servers may be reported and compared with a power budget, e.g., maximum available power, to determine whether power utilization is close to, or reaching, available power. The storage array may measure power consumption during low IO periods and high IO periods and calculate the power differences between low IO load and high IO load. The IO power consumption may be sampled at high rates, e.g., 10 msec, 100 msec, etc., as IO rates may fluctuate considerably over small time periods. The power control module and/or an administrator uses the logged and reported information to determine how to adjust power utilization as will be described below.

Step 304 is determining whether the host applications can tolerate greater IO latency, IO rescheduling, or both. The power control module obtains IO latency statistics from the compute nodes. IO latency may be measured as the elapsed time between receipt of an IO by the storage array and transmission of the data (in the case of a Read) or transmission of an ACK (in the case of a Write) from the storage array. The IO latency experienced by a storage group or storage object is compared with the service level of the storage group or storage object to determine whether the host application can tolerate greater IO latency. It is known in the art to measure IO latency to determine and manage compliance with service level guarantees. For example, a first host application that requires or will benefit most from lowest possible IO latency may be assigned a platinum service level while a second host application that does not require or will not sufficiently benefit from the lowest possible IO latency may be assigned a bronze service level, where platinum and bronze correspond to different IO latency levels measured in IOs per second (IOPS). IO latency is a function of multiple variables including overall loading on the storage array, so a lightly loaded storage array might provide platinum level IO latency to a bronze host application/storage group. Such over-servicing of a storage group presents an opportunity for power savings. Storage groups that are experiencing sufficiently lower latency than the latency guarantee indicated by the assigned service level are able to tolerate greater IO latency. Tolerance of IO rescheduling may be determined based on host application name or type. Certain host applications are tolerant of IO rescheduling, while other host applications are intolerant of IO rescheduling. A table or other record may be used to record the distinction for individual applications.

Step 306 is determining whether the power cost or power availability are better at a different time. Power demand by all subscribers of a power producer may be cyclical or vary over time depending on a variety of factors such as time of day, day of the week, season, and weather. Consequently, power producers may vary the cost per kilowatt hour charged to subscribers. The power control module is provided with an indication of power cost variability in order to determine whether power cost is better (lower) at a different time than the present time. Power availability may vary for the same or similar reasons as power cost. For example, during periods of high demand for power, such as during a heat wave, the power demands of the data center may exceed the amount of power that can be provided to the data center by the power producer. The power control module is provided with an indication of power availability in order to manage power utilization to avoid exceeding available power limits. If power utilization is above a predetermined threshold relative to the available power, e.g., utilization above 90% of limit, and utilization is logged as being a lower percentage of the limit at a different time of day then power is more available at a different time of day.

If it is determined in step 306 that power cost and/or power availability are better at a different time than the present, then step 314 is rescheduling IOs from the applications that are tolerant of IO rescheduling. IO rescheduling may include the storage array sending a message or other communication to the host servers to indicate that IOs generated by the applications that are tolerant of IO rescheduling will not be processed or should not be sent until a later time. A variety of techniques may be utilized for communications related to IO rescheduling, including but not limited to representational state transfer.

If it is determined in step 306 that power cost and/or power availability are not better at a different time of day, or following step 314, step 308 is determining whether all applications currently sending IOs to the storage array can tolerate greater IO latency or whether a maximum allowed storage array power consumption level has been reached. If either or both of those conditions evaluate to true, then step 312 is reducing storage array power consumption. Storage array power consumption can be reduced in a variety of ways, including, but not limited to, reducing processor clock speed, reducing memory clock speed, reducing allocations of processor cores and/or memory, either alone or in combination. The extent to which storage array power consumption is reduced may be calculated and targeted to avoid exceeding the maximum allowed storage array power consumption level while increasing IO latency to a range that satisfies all service level guarantees plus no more than a predetermined percentage, e.g., from X to (X+0.1*X) IOPS where X IOPS is specified by the service level.

If it is determined at step 308 that at least one application currently sending IOs to the storage array cannot tolerate greater IO latency and the maximum allowed storage array power consumption level has not been reached, or following step 312, step 310 is identifying which ones of the host servers is currently running only applications that can tolerate greater IO latency or has reached the maximum server power consumption limit. If any servers satisfy either of those conditions, then step 312 is reducing the power consumption of those servers identified in step 310. Server power consumption can be reduced in a variety of ways, including, but not limited to, reducing processor clock speed, reducing memory clock speed, reducing allocations of processor cores and/or memory, either alone or in combination. The extent to which server power consumption is reduced may be calculated and targeted to avoid exceeding the maximum allowed server power consumption level and increase IO latency to a range that satisfies service level guarantees plus no more than a predetermined percentage, e.g., from X to (X+0.1*X) IOPS where X IOPS is specified by the service level.

The steps are iterated so monitoring is ongoing, and adjustments are dynamic. In other words, the power control module adapts to changes in IO loading, supported host applications, power availability, power cost, and other factors.

In some implementations the conditions for reduction of power consumption include overall power consumption of the storage array and host servers relative to an overall power budget or limit. For example, step 308 may determine whether overall power consumption of the storage array and servers has reached an overall power budget or limit and, if that condition is true, prompt reduction of storage array power in step 312. Similarly, step 310 may determine whether overall power consumption of the storage array and servers has reached the overall power budget or limit and, if that condition is true, prompt reduction of server power consumption in step 312. In such an implementation the power control module may prompt all or only selected ones of the servers to reduce power consumption, e.g., selecting only those servers with the highest levels of power utilization.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented by a storage system configured to maintain data used by a plurality of applications running on a plurality of servers that access the data from the storage system, the method comprising:
the storage system calculating per-application power utilization by the storage system, exclusive of power utilization by the servers, attributable to provision of data access to each of the plurality of applications as a function of input-output (IO) commands received from the plurality of servers over a period of time; and
prompting adjustment of at least one storage system setting based on the calculated power utilization of each of the plurality of applications to reduce future power utilization by the storage system attributable to provision of data access to at least one of the plurality of applications.

2. The method of claim 1 comprising determining which of the plurality of applications are tolerant of IO rescheduling such that sending of IOs from those applications can be delayed until a later time without negating functionality of the applications.

3. The method of claim 2 comprising rescheduling IOs of at least some of the applications determined to be tolerant of IO scheduling to a time of day characterized by low power cost by the storage array signaling to the servers running the tolerant applications to indicate that IOs from the tolerant applications will not be processed or should not be sent by the servers until a later time.

4. The method of claim 1 comprising determining which of the plurality of applications are tolerant of greater IO latency such that the storage array can service IOs from those applications at a slower rate without negating functionality of the applications.

5. The method of claim 4 comprising reducing power utilization of the storage system in response to determining that all of the plurality of applications are tolerant of greater IO latency.

6. The method of claim 4 comprising reducing power utilization of one of the plurality of servers in response to determining that all of the plurality of applications running on that server are tolerant of greater IO latency.

7. The method of claim 1 comprising reducing power utilization.

8. The method of claim 1 comprising identifying individual ones of the plurality of applications based on which storage objects contain data associated with the IO commands.

9. The method of claim 1 comprising identifying individual ones of the plurality of applications based on tags associated with the IO commands.

10. The method of claim 4 comprising using service level to determine which of the plurality of applications are tolerant of greater IO latency.

11. An apparatus comprising:
a storage system configured to maintain data used by a plurality of applications running on a plurality of servers that access the data from the storage system, the storage system configured to calculate per-application power utilization by the storage system, exclusive of power utilization by the servers, attributable to provision of data access to each of the plurality of applications as a function of input-output (TO) commands received from the plurality of servers over a period of time, and prompt adjustment of at least one storage system setting based on the calculated power utilization of each of the plurality of applications to reduce future power utilization by the storage system attributable to provision of data access to at least one of the plurality of applications.

12. The apparatus of claim 11 comprising a power control module configured to determine which of the plurality of applications are tolerant of IO rescheduling such that transmission of IOs from those applications can be delayed until a later time without negating functionality of the applications and the storage array signaling to the servers running the tolerant applications to indicate that IOs from the tolerant applications will not be processed or should not be sent by the servers until a later time.

13. The apparatus of claim 11 comprising a power control module configured to determine which of the plurality of applications are tolerant of greater IO latency.

14. The apparatus of claim 13 wherein the power control module is configured to use service level to determine which of the plurality of applications are tolerant of greater IO latency.

15. The apparatus of claim 11 comprising a power control module configured to reduce power utilization.

16. The apparatus of claim 11 comprising a power control module configured to identify individual ones of the plurality of applications based on which storage objects contain data associated with the IO commands.

17. The apparatus of claim 11 comprising a power control module configured to identify individual ones of the plurality of applications based on tags associated with the IO commands.

18. A non-transitory computer-readable storage medium storing instructions that when executed by a storage system perform a method for power management, the method comprising:

the storage system calculating per-application power utilization by the storage system, exclusive of power utilization by the servers, attributable to provision of data access to each of a plurality of applications as a function of input-output (TO) commands received from a plurality of servers over a period of time; and prompting adjustment of at least one storage system setting based on the calculated power utilization of each of the plurality of applications to reduce future power utilization by the storage system attributable to provision of data access to at least one of the plurality of applications.

19. The non-transitory computer-readable storage medium of claim 18 wherein the method comprises determining which of the plurality of applications are tolerant of IO rescheduling such that sending of IOs from those applications can be delayed until a later time without negating functionality of the applications and the storage array signaling to the servers running the tolerant applications to indicate that IOs from the tolerant applications will not be processed or should not be sent by the servers until a later time.

20. The non-transitory computer-readable storage medium of claim 18 wherein the method comprises determining which of the plurality of applications are tolerant of greater IO latency.

* * * * *